Patented July 3, 1928.

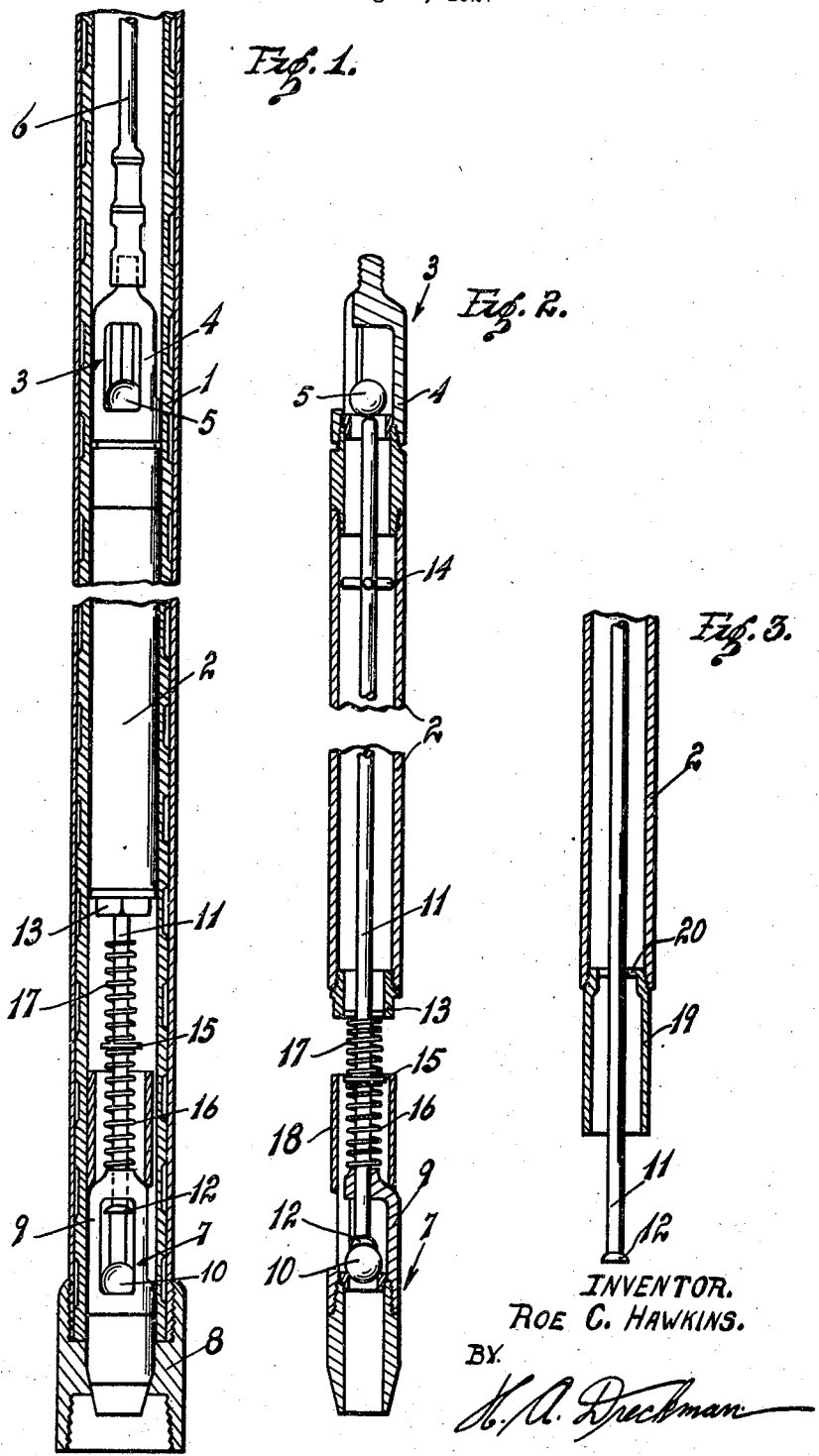

1,676,186

UNITED STATES PATENT OFFICE.

ROE C. HAWKINS, OF LONG BEACH, CALIFORNIA, ASSIGNOR OF ONE-THIRD TO FRANK E. ABBOTT, OF LONG BEACH, CALIFORNIA.

VALVE CONTROL FOR PLUNGER PUMPS.

Application filed August 15, 1927. Serial No. 212,970.

Oil wells drilled in a sandy formation are troubled with what is known as "sanding up in the valves." The sand enters and lodges in the valves to such an extent that the ball check is held off of its seat and consequently the pump cannot function. Also in wells having a heavy gas pressure, the ball is frequently prevented from seating at the proper time, due to this pressure.

An object of my invention is to provide a novel plunger pump, the valves of which are positively actuated.

Another object is to provide a pump in which the standing valve is positively closed and the top valve is positively opened, on each down stroke of the plunger.

A further object is to provide a valve actuating means for a pump which also acts as a standing valve puller.

Still further objects are to provide a device of the character stated, which is simple in construction and highly effective in operation.

Other objects, advantages and features of invention may appear from the accompanying drawing, the subjoined detailed description, the appended claims, or in the operation of the device.

In the drawing—

Fig. 1 is a fragmentary longitudinal sectional view of the pump assembly.

Fig. 2 is a fragmentary longitudinal sectional view of the pump plunger and standing valve.

Fig. 3 is a fragmentary longitudinal sectional view of a modified form of plunger.

Referring more particularly to the drawing:

The usual well pump comprises a pump barrel 1 in which a hollow plunger 2 is reciprocally mounted. A top valve 3 is mounted on the plunger 2 in the usual way and comprises a cage 4 in which a check ball 5 is mounted. The sucker rods 6 are connected to the cage 4 and the pump is actuated thereby; as is well known in the art.

A standing valve 7 is positioned below the plunger 2 and is seated in the bottom collar 8. This valve comprises a cage 9 in which the usual ball check 10 is positioned. To positively control the balls 5, 10, I have provided a control rod 11, which is slidably mounted in the top of the cage 9, and extends into the plunger 2. A head 12 is formed on the lower end of the rod 11 to prevent said rod from pulling out of the cage 9, the purpose of which will be further described.

A guide nut 13 is screwed into the lower end of the plunger 2 and the rod 11 is guided therein. A guide 14 is also provided adjacent the upper end of the rod, which guide bears against the inside of the plunger.

A collar 15 is secured to the rod 11 and a spring 16 is positioned between said collar and the top of the cage 9. A second spring 17 rests on the collar 15 and is adapted to be engaged by the guide nut 13, as will be further described.

If desired the stroke of the plunger 2 may be so adjusted that on its down stroke it will engage and compress the spring 17 and also spring 16, thus urging the rod 11 downwardly and causing the head 12 to engage and forcibly seat the ball 10. On the up stroke of the plunger the spring 16 will raise the rod 11 and release the ball 10. Also at the bottom of the stroke of the plunger 2, the top of the rod 11 engages the top valve ball 5 and raises it from its seat, thus insuring the proper operation of the pump. To prevent the hammering of the plunger 2 on the ball 10, I provide a check sleeve 18 extending upwardly from the cage 9 and resting on or integral with said cage. If the plunger should accidentally move too low, the nut 13 will engage and hit on the sleeve 18 and thus prevent injury to the ball 10.

In Fig. 3 I have shown a slightly modified form of plunger barrel in which the check sleeve 19 may be formed as a part of the guide nut 20, or the sleeve may even be an extension of the plunger barrel.

It is not essential that the plunger 2 shall operate the rod 11 at every stroke, but if the well starts to sand up or the like, the plunger can be lowered and the rod brought into action as previously stated.

In pulling the pump the guide 14 on the rod 11 will rest on top of the nut 13, and the head 12 on said rod will cause the standing valve 7 to be removed simultaneously with the plunger 2.

Having described my invention, I claim:

1. In a plunger pump comprising a reciprocating plunger, and a standing valve, a ball check in said valve, a control rod, adapted to engage and seat said ball, and resilient means positioned between said rod and plunger whereby the rod is yieldingly urged against the ball by the plunger.

2. In a plunger pump comprising a reciprocating plunger and a standing valve, a ball check in said valve, a control rod, adapted to engage and seat said ball, and resilient means positioned between said rod and plunger whereby the rod is yieldingly urged against the ball by the plunger, and check means to limit the downward movement of the plunger.

3. In a plunger pump comprising a reciprocating plunger and a standing valve, a ball check in said valve, a control rod, adapted to engage said ball, and resilient means positioned between said rod and plunger whereby the rod is yieldingly urged against the ball by the plunger, and a second resilient means urging said rod upwardly off of the ball.

4. In a plunger pump comprising a reciprocating plunger, a top valve on said plunger, a standing valve, and means operable by said plunger whereby the top and standing valves are controlled, said means comprising a rod extending into said plunger, said rod being adapted to be engaged by the plunger on its down stroke to positively actuate said top and standing valves, a collar on said rod, a spring between said collar and the standing valve, and a second spring above said collar adapted to be engaged by the plunger.

5. In a plunger pump comprising a reciprocating plunger, a top valve on the plunger, a standing valve consisting of a cage and a ball check therein, a rod slidably mounted in said cage and extending into said plunger, a collar on said rod and a spring positioned above said collar adapted to be engaged by the plunger to urge the rod against the ball check.

6. In a plunger pump comprising a reciprocating plunger, a top valve on the plunger, a standing valve consisting of a cage and a ball check therein, a rod slidably mounted in said cage and extending into said plunger, a collar on said rod and a spring positioned above said collar adapted to be engaged by the plunger to urge the rod against the ball check, and a second spring positioned between the collar and the cage.

7. In a plunger pump comprising a reciprocating plunger, a top valve on the plunger, a standing valve consisting of a cage and a ball check therein, a rod slidably mounted in said cage and extending into said plunger, a collar on said rod and a spring positioned above said collar adapted to be engaged by the plunger to urge the rod against the ball check, said rod having a head thereon to engage the cage when removing the pump.

8. In a plunger pump comprising a reciprocating plunger, a top valve on the plunger, a standing valve consisting of a cage and a ball check therein, a rod slidably mounted in said cage and extending into said plunger, a collar on said rod and a spring positioned above said collar adapted to be engaged by the plunger to urge the rod against the ball check, and stop means to limit the downward movement of the plunger.

9. In a plunger pump comprising a reciprocating plunger and a standing valve, a ball check in said valve, a control rod, adapted to engage said ball, and resilient means positioned between said rod and plunger whereby the rod is yielding urged against the ball by the plunger, said rod being formed with a head adapted to engage and seat the standing valve ball.

In testimony whereof, I affix my signature.

ROE C. HAWKINS.